United States Patent
Tomberger et al.

(10) Patent No.: US 11,697,405 B2
(45) Date of Patent: Jul. 11, 2023

(54) METHOD AND DEVICE FOR DETERMINING BRAKING-RELATED ACTUAL VALUES OF A RAIL VEHICLE FOR CARRYING OUT A DECELERATION-CONTROLLED BRAKING WITH A CENTRAL SENSOR SYSTEM

(71) Applicant: KNORR-BREMSE SYSTEME FÜR SCHIENENFAHRZEUGE GMBH, Munich (DE)

(72) Inventors: Christoph Tomberger, Munich (DE); Ulf Friesen, Neubiberg (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 241 days.

(21) Appl. No.: 16/643,248

(22) PCT Filed: Aug. 21, 2018

(86) PCT No.: PCT/EP2018/072507
§ 371 (c)(1),
(2) Date: Feb. 28, 2020

(87) PCT Pub. No.: WO2019/042816
PCT Pub. Date: Mar. 7, 2019

(65) Prior Publication Data
US 2020/0262400 A1    Aug. 20, 2020

(30) Foreign Application Priority Data
Aug. 31, 2017 (DE) .................. 10 2017 119 994.2

(51) Int. Cl.
*B60T 8/17* (2006.01)
*B60T 8/171* (2006.01)
(Continued)

(52) U.S. Cl.
CPC ............ *B60T 8/1705* (2013.01); *B60T 8/171* (2013.01); *B60T 8/172* (2013.01); *B60T 8/245* (2013.01); *B60T 8/3235* (2013.01)

(58) Field of Classification Search
CPC ........ B60T 8/1705; B60T 8/171; B60T 8/172; B60T 8/245; B60T 8/3235
See application file for complete search history.

(56) References Cited

U.S. PATENT DOCUMENTS

| 4,825,111 A | * | 4/1989 | Hommes | ............... B60L 15/005 318/135 |
| 5,758,848 A | * | 6/1998 | Beule | ..................... B61L 17/00 701/19 |

(Continued)

FOREIGN PATENT DOCUMENTS

| DE | 19933789 A1 | 2/2011 |
| DE | 102015110053 A1 | 12/2016 |

OTHER PUBLICATIONS

International Search Report corresponding to PCT/EP2018/072507, dated Nov. 19, 2018.

*Primary Examiner* — Aniss Chad
*Assistant Examiner* — Stephanie T Su
(74) *Attorney, Agent, or Firm* — Barnes & Thornburg LLP

(57) ABSTRACT

A method and a device for determining braking-related actual values of a train assembly including multiple carriages for carrying out a deceleration-controlled braking of the train assembly, in which the longitudinal deceleration and the longitudinal slope are considered to be actual values, from which an adjustment value balancing the control deviation is determined for a control element of the brake by (Continued)

a deceleration controller/deceleration force controller according to a predefined setpoint value of a desired braking deceleration.

10 Claims, 1 Drawing Sheet

(51) Int. Cl.
  *B60T 8/172* (2006.01)
  *B60T 8/24* (2006.01)
  *B60T 8/32* (2006.01)

(56) References Cited

U.S. PATENT DOCUMENTS

| | | | |
|---|---|---|---|
| 2006/0012246 A1* | 1/2006 | Smith | B61L 3/127 |
| | | | 303/155 |
| 2010/0235022 A1* | 9/2010 | Siddappa | B61L 3/006 |
| | | | 303/151 |
| 2014/0336892 A1* | 11/2014 | Braunberger | G01C 5/005 |
| | | | 701/70 |

* cited by examiner

METHOD AND DEVICE FOR DETERMINING BRAKING-RELATED ACTUAL VALUES OF A RAIL VEHICLE FOR CARRYING OUT A DECELERATION-CONTROLLED BRAKING WITH A CENTRAL SENSOR SYSTEM

CROSS REFERENCE AND PRIORITY CLAIM

This patent application is a U.S. National Phase of International Patent Application No. PCT/EP2018/072507 filed Aug. 21, 2018, which claims priority to German Patent Application No. 10 2017 119994.2, the disclosure of which being incorporated herein by reference in their entireties.

FIELD

The disclosed embodiments relate to a method and a device for determining braking-related actual values of a train assembly consisting of a large number of carriages, in particular a rail vehicle, for carrying out deceleration-controlled braking of the train assembly, in which the longitudinal deceleration of the latter and the longitudinal inclination are taken into account as actual values, from which a manipulated variable compensating for the system deviation is determined for an actuator of the brake by a deceleration controller in accordance with a predefined setpoint value of a desired braking deceleration.

BACKGROUND

The present disclosed embodiments extend primarily to rail vehicle construction. Train assemblies usually composed of individual carriages must comply with predefined braking distances in transport and, in particular, must come to a stop at points previously signaled to them. A rail vehicle is braked according to precisely defined criteria, including deceleration characteristic curves, the compliance with which is relevant to ensuring economical and safe operation of the rail vehicle. Different brake types are involved in each braking operation of a modern rail vehicle, for example friction brakes, electrodynamic brakes, magnetic rail brakes or eddy current brakes. Each of these brakes has specific advantages, for example a speed or power range in which efficient and minimum-wear braking is possible. In this case, each brake type has specific tolerances and inaccuracies in the application of the braking force, which results in undesirable variations in the braking force achieved over the course of braking operations.

SUMMARY

Against this background, the exact metering of braking would require feedback of the actually exerted braking force by communicating this to the vehicle driver via a display in the driver's cab, for example, or supplying it directly to an electronic control loop for the braking force as an actual value. However, if a plurality of brake types interact at the same time in particular, the braking force exerted by each individual brake cannot be measured directly, but rather only circuitously with corresponding inaccuracies, for instance via the electrical power consumed, via a brake cylinder pressure or via material expansions. The physical relationship between these variables and the braking force is often not linear and is also subject to systematic and random fluctuations.

The presently disclosed embodiments provide a method and a device for centrally capturing measured values for a deceleration control system, in particular of a rail vehicle, which ensures accurate braking in the case of long train assemblies consisting of a large number of carriages.

BRIEF DESCRIPTION OF THE FIGURES

Measures which improve the disclosed embodiments are described in more detail below together with the description of an exemplary embodiment based on the figures, in which.

DETAILED DESCRIPTION

Figure 1:
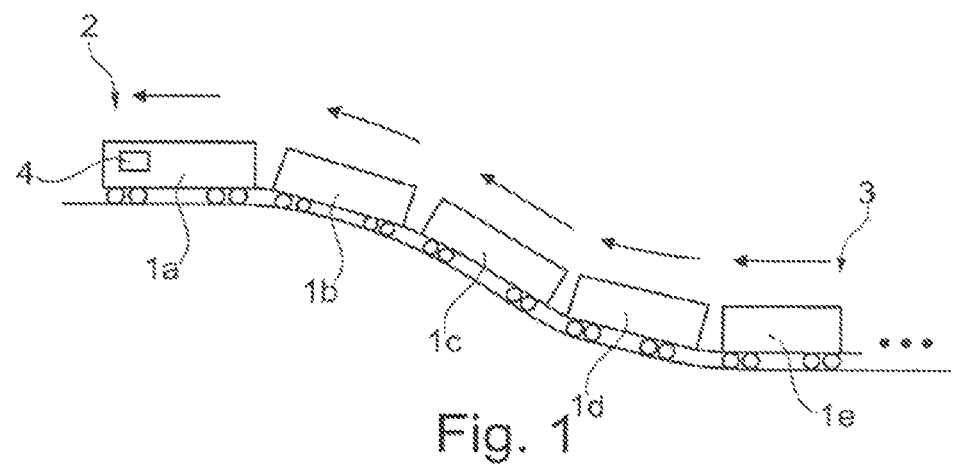
FIG. 1 shows a schematic side view of a train assembly traveling on an upward slope.

Disclosed embodiments provide a method and a device for centrally capturing measured values for a deceleration control system, in particular of a rail vehicle, which ensures accurate braking in the case of long train assemblies consisting of a large number of carriages.

Conventionally, DE 10 2011 052 545 A1 reveals a technical solution, with which, in order to solve the above-mentioned problem, the values representative of the longitudinal deceleration of the vehicle are used as actual values in order to aim for a predefined setpoint value for the longitudinal deceleration of the vehicle via a control loop. The effect of braking in the form of a deceleration at the vehicle level is therefore controlled. However, this control does not provide the actually effective braking force. In addition, control to a setpoint value for the longitudinal deceleration of the vehicle has the secondary effect that the topology-induced possible deceleration is not utilized on the upward slope of the route and that the brake is overused on the downward slope of a route.

In order to solve this problem, DE 10 2015 110 053 A1 proposes that, in addition to capturing the longitudinal deceleration acting on the vehicle, the grade resistance caused by an upward slope or downward slope of the route is also determined, with the result that the braking force is calculated based on the longitudinal deceleration of the vehicle and the grade resistance.

The longitudinal deceleration of the vehicle is the kinematic deceleration along the vehicle longitudinal axis. The vehicle longitudinal axis is always parallel to the route, with the result that it inclines with the route during the transition to an upward slope or a downward slope.

The grade resistance is that force which acts on the vehicle in the direction of travel in the case of an inclination of the route out of the plane, that is to say as a result of an upward slope or downward slope. The vertically downward weight force of the vehicle in the Earth's gravitational field can be considered to be the vector sum of this grade resistance and a normal force which is perpendicular to the vehicle and is transmitted from the vehicle to the route.

The use of a deceleration sensor, which also statically concomitantly measures the gravitational acceleration in order to determine the longitudinal deceleration of the vehicle, has the advantage that upward slopes and downward slopes do not change the sensor signal, with the result that the influence of an upward slope and a downward slope on the longitudinal deceleration of the vehicle is not taken into account. This means that the deceleration of the vehicle occurring on account of an upward slope, as would also occur during pure rolling, does not occur in the sensor signal. The sensor measures only additional decelerations which occur as a result of the braking, for example. If this is not the case, that is to say the deceleration is determined and controlled, for example, based on the vehicle speed, this results in the braking distance being set independently of upward slopes. This means that the braking distance on the flat is the same length as on upward slopes. This is not desirable since the distant signal distances between the distant signal and the main signal could be adapted to the upward slope of the route based on country-specific regulations. In addition, the brake of the vehicle would be released on upward slopes and the vehicle would therefore behave unnaturally. The use of a deceleration sensor in order to determine the longitudinal deceleration of the vehicle during control of the deceleration thus results in a desired behavior of the overall system by virtue of the longitudinal accelerations of the vehicle which occur as a result of an upward slope and a downward slope not being taken into account in the actual signal from the deceleration sensor.

In the case of long train assemblies consisting of many individual carriages, the braking force can be interpreted differently if the slope of the route changes in the case of a deceleration sensor arranged centrally in the train assembly at any desired location, optionally in the lead vehicle, since rear carriages of the train assembly can still push or brake the latter. This is because, in particular in the case of long train assemblies and the local downward slope changes which occur in the infrastructure, it is not ensured that all carriages of the train assembly are on the same or even only approximately the same downward slope or upward slope at any time. The longitudinal acceleration acting on the rail vehicle on account of the downward slope or upward slope results from the downward slope or upward slope on which each individual carriage is situated. Each carriage can be in a different region if the upward slope or downward slope changes.

When crossing a summit for example, the influence of the change in the downward slope on the longitudinal deceleration of the train assembly will vary. This has a decelerating effect on the upward slope. On the summit, in which case the leading carriage is on the downward slope and the last carriage is still on the upward slope, the downward slope has no effect whatsoever on the longitudinal deceleration of the train, in the same way as the train is accelerated on the flat and on the subsequent downward slope. If the rail vehicle brakes during a change in the downward slope with an activated deceleration controller, an error between the measured value and the actually expected downward-slope-compensated or upward-slope-compensated deceleration results when measuring the longitudinal deceleration using an acceleration sensor at a central location of the train. This error can result in a significant extension of the braking distance of the train.

The disclosed embodiments includes the technical teaching that the braking-related actual values are captured and/or calculated for the entire train assembly by a central measured value capture unit positioned in the frontmost train part and having a plurality of sensors, wherein the train length is concomitantly taken into account as an additional centrally determined actual value by the deceleration controller in such a manner that, when calculating the manipulated variable for compensating for a system deviation, a braking requirement which is different depending on the train length is taken into account based on the rise profile resulting from the determined longitudinal inclination in the front train part along the train length.

It is, therefore, possible to optimize the deceleration or braking force control of a rail vehicle by determining the deceleration or braking force of the rail vehicle with the aid of the measured value capture unit which is positioned centrally in the train assembly in the frontmost train part, optionally the lead vehicle. The measured value capture unit may include a plurality of sensors which determine the longitudinal deceleration and/or the longitudinal inclination at this central position using an angle measurement. Alternatively, these measured values can also be obtained using conversion from other physical variables or by specifying other system units of the rail vehicle.

With the aid of these measurement variables and with knowledge of the train length, the actual value of a train deceleration, which is the subject matter of the disclosed embodiments, can be calculated permanently (on-board) in a train model calculation of the measured value capture unit based on the change in the upward slope. This actual signal is then available to the actual deceleration controller of the brake control system, which is preferably in the same control device as the measured value capture unit.

The advantage of this method is that only sensors at a central location are required and there is no need for extensive data communication over the length of the train. If a rail vehicle is operated in both directions, the device implementing the method according to the disclosed embodiments should be provided at the two ends of the train, which alternately form the frontmost train part in the sense of the disclosed embodiments, since the device according to the disclosed embodiments must always be active in the leading train part. As a result of the solution according to the disclosed embodiments of determining actual values using deceleration sensors taking into account the train length, braking can also be used in an optimum manner in the case of long rail vehicle configurations in transition zones of upward slopes.

In a further development of the solution according to the disclosed embodiments, the inclination-based longitudinal deceleration can also be determined separately for each carriage of the train assembly. In order to calculate a consistent manipulated variable, however, it is proposed to form a mean value of the individual inclination-based longitudinal decelerations for each carriage. For the separate inclination-based longitudinal deceleration, it is not necessary for a corresponding sensor system to be installed in each carriage of the train assembly. As a result of the train model calculation, these individual actual values can be determined in a much simpler manner by calculation if the travel speed of the rail vehicle is known.

The train length may be calculated based on the train model in such a manner that the number of carriages of the train assembly which are coupled to one another and their respective length are taken into account. Adding the partial lengths results in the calculated total train length of the rail vehicle which can also be flexibly adapted after the number of carriages and carriage types change.

The actual values of the longitudinal deceleration of the rail vehicle, of the travel speed and of the longitudinal inclination which are supplied to the input side of the deceleration controller of the brake system can be determined in different ways:

With regard to the longitudinal deceleration of the rail vehicle, it is possible for this to be obtained either using mathematical derivation from a speed measurement along the train assembly or directly using an acceleration sensor. The first alternative provides a non-upward-slope-compensated actual value for the longitudinal deceleration, whereas the measured value determined using a sensor provides an upward-slope-compensated actual value for this, as discussed above.

The actual value of the speed of the rail vehicle can likewise be effected using a sensor using a speed measurement on a vehicle wheel using pulse generators and a subsequent speed calculation by including the wheel diameter. Alternatively, a radar measurement or a measurement using optical sensors or the like is also conceivable. Furthermore, GPS (Global Positioning System) signal processing can also provide the current speed of the rail vehicle.

The actual value of the longitudinal inclination can be determined, for example, using an angle measuring sensor. The angle measuring sensor is used to measure the direct angle or its change in the vehicle longitudinal axis with respect to the horizontal. This angle sensor can also be designed based on acceleration sensors which measure the deflected angle with respect to the gravitational acceleration. In addition, an upward slope/downward slope can also be determined using localization using GPS and an elevation profile of the route stored therein. A further alternative is to determine the angle from a comparison of the signal from the upward-slope-compensated deceleration sensor and a non-upward-slope-compensated signal from the speed, for example obtained from wheel speeds or the GPS signal.

FIG. 1 shows a train assembly which consists of a large number of carriages $1a$ to $1e$ and is in the form of a rail vehicle. The individual direction of travel is assigned to each of the carriages $1a$ to $1e$ using a vector arrow. The train assembly is therefore on an upward slope journey, in which the carriage $1a$ of the frontmost train part 2 has currently reached the maximum height, while the middle carriages $1b$ to $1d$ are on an upward slope and the carriage $1e$ forming the rear train part 3 is still at the beginning of the upward slope. During the exemplary upward slope journey which is illustrated here, it is advantageous, for uniform deceleration-controlled braking using only a front measurement point for determining the longitudinal deceleration of the train assembly as the actual value, if the individual longitudinal inclination of each carriage $1a$ to $1e$ and the resulting different braking requirement are also taken into account in the calculation of the manipulated variable for achieving the predefined setpoint value of a desired braking deceleration.

Figure 2:
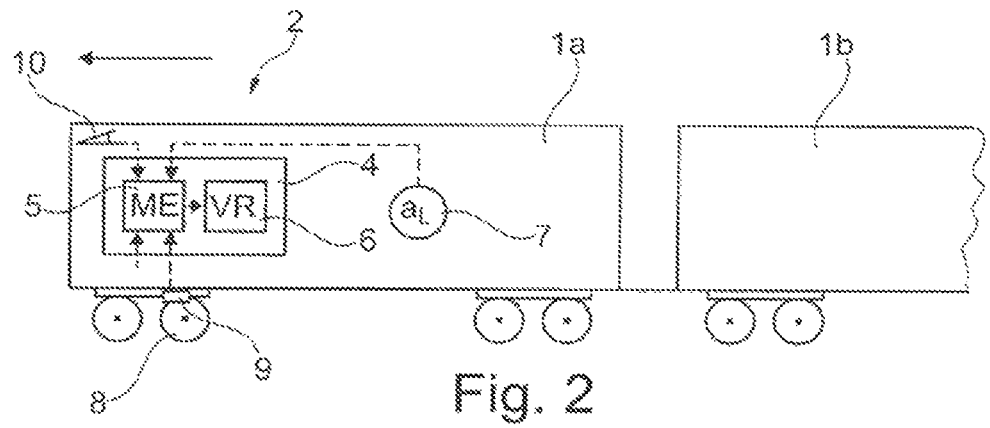
FIG. 2 shows a schematic side view of a part of the train assembly according to FIG. 1 with a device for determining braking-related actual values.

FIG. 2 shows a structural unit 4 which is arranged for this purpose in the frontmost train part 2—in the carriage $1a$ in this case—and comprises a measured value capture unit 5 and a deceleration controller/deceleration force controller 6 connected thereto. The measured value capture unit 5 permanently measures the longitudinal deceleration $a_L$ using an acceleration sensor 7 which is likewise part of the measured value capture unit 5. The acceleration sensor 7 is arranged in the carriage $1a$. In this exemplary embodiment, the speed $v_Z$ of the rail vehicle is additionally measured using a speed sensor 9 arranged on a vehicle wheel 8 and is supplied to the input side of the measured value capture unit 5. The speed sensor 9 is likewise part of the central measured value capture unit 5. Yet further actual values which are measured or are determined by calculation are also passed to the measured value capture unit 5 in order to control the deceleration, which values are explained below.

Figure 3:
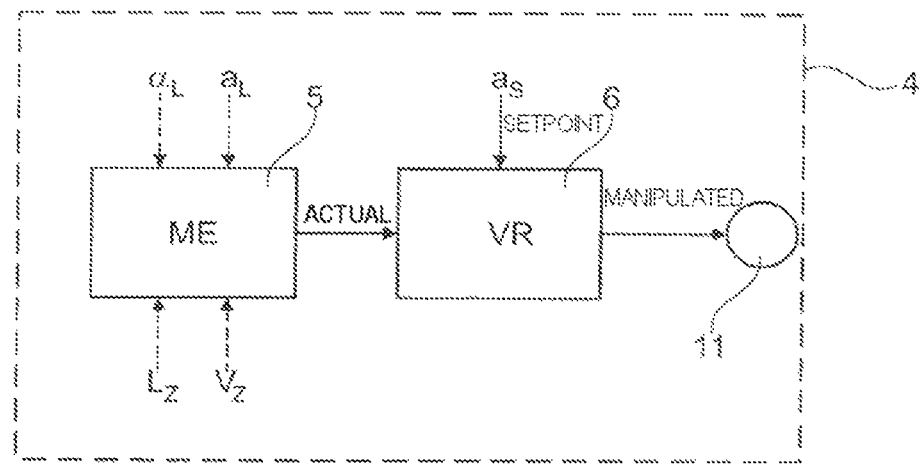
FIG. 3 shows a block diagram of a structural unit comprising a measured value capture unit and a deceleration controller.

FIG. 3 shows a block diagram of the deceleration controller/deceleration force controller and the measured value capture unit 5 arranged in a combined manner within the structural unit 4 with a downstream deceleration controller/deceleration force controller 6. Accordingly, in addition to the measured value of the speed $v_Z$ of the rail vehicle and the longitudinal deceleration $a_L$, the longitudinal inclination $\alpha_L$ and the train length $L_Z$ derived from a train model are also supplied to the measured value capture unit 5. The measured value capture unit 5 determines a braking-related actual value therefrom in accordance with the solution according to the disclosed embodiments, from which the deceleration controller 6 determines the system deviation in comparison with a predefined setpoint value of a desired braking deceleration and outputs a corresponding manipulated variable to an actuator 11, for example a compressed air brake.

When controlling the deceleration, the deceleration controller/deceleration force controller 6 takes into account the train length $L_Z$ as an additional actual value for calculating the manipulated variable in such a manner that a braking requirement which is different depending on the train length is hereby taken into account based on the rise profile resulting from the determined longitudinal inclination $\alpha_L$ in the front train part along the train length $L_Z$.

If the longitudinal inclination $\alpha_L$ is constant, the acceleration sensor 7 for determining the longitudinal deceleration $a_L$ measures the correct train deceleration taking into account the influence of the upward or downward slope. If the measured value from the angle measuring sensor 10 for the longitudinal inclination $\alpha_L$ in the frontmost vehicle part 2 changes during the journey, the inclination-based deceleration of each carriage $1a$ to $1e$ can be determined with the aid of the stored train model, which comprises the number of carriages $1a$ to $1e$ and their length, and the measured speed $v_Z$. A correct actual value is permanently calculated from these values as the overall value for the deceleration of the train assembly, here by averaging the individual values. The control-related error described at the outset is optimally compensated for over the train length with this method.

Disclosed embodiments are not restricted to the exemplary embodiment described above. Rather, modifications thereof which are concomitantly included in the scope of protection of the following claims are also conceivable. For example, it is also possible for additional or supplementary calculation steps to be concomitantly taken into account in the method for forming the actual value, for example filtering, plausibility-checking or synchronization of measurement signals.

Furthermore, it is also conceivable for the measured value capture to be concomitantly integrated in the brake control system of the rail vehicle. This makes it possible to use the advantage that the speed calculation already present in a conventional brake control system for the so-called reference speed, which is used for the slide protection device, can be concomitantly used to control the deceleration. Fewer electronic components are additionally also required as a result of this measure.

LIST OF REFERENCE SIGNS

1 Carriage
2 Frontmost train part
3 Rearmost train part
4 Structural unit
5 Measured value capture unit
6 Deceleration controller/deceleration force controller
7 Acceleration sensor
8 Vehicle wheel
9 Speed sensor
10 Angle measuring sensor
11 Actuator $a_L$ Longitudinal deceleration
$\alpha_L$ Longitudinal inclination
$v_Z$ Train speed
$L_Z$ Train length
$a_S$ Setpoint value (for deceleration control)

The invention claimed is:

1. A method for determining braking-related actual values of a train assembly including of a plurality of carriages for carrying out deceleration-controlled braking of the train assembly, the method comprising:
capturing or calculating braking-related actual values for the entire train assembly by a central measured value capture unit positioned only in a frontmost, only a rearmost, or only the front and rearmost train part and having a plurality of sensors; and
determining a manipulated variable for compensating for system deviation for an actuator of a brake by a deceleration controller/deceleration force controller in accordance with a predefined setpoint value of a desired braking deceleration, wherein the determination is based on longitudinal deceleration ($a_L$) and longitudinal inclination ($\alpha_L$) as actual values
wherein the manipulated variable is further determined based on a length of the train ($L_Z$) as an additional centrally determined actual value by the deceleration controller/deceleration force controller such that calculation of the manipulated variable for compensating for the system deviation includes a braking requirement that is different depending on the train length based on a rise profile resulting from the determined longitudinal inclination ($\alpha_L$) in the frontmost train part along the train length ($L_Z$), and
wherein the inclination-based longitudinal deceleration (aL) is determined by the central measured value capture unit separately for each carriage of the train assembly based on a stored train model, a longitudinal inclination, and a measured speed.

2. The method of claim 1, further comprising forming a mean value of the individual inclination-based longitudinal decelerations ($a_L$) for each carriage to calculate a consistent manipulated variable.

3. The method of claim 1, wherein the train length ($L_Z$) is calculated from the train model which is based on the number of carriages of the train assembly which are coupled to one another and their respective length.

4. The method of claim 1, wherein the actual value of the speed ($v_Z$) is determined based on a speed measurement on a vehicle wheel or via a GPS unit or a pure radar unit.

5. The method of claim 1, wherein the actual value of the longitudinal deceleration ($a_L$) is determined based on mathematical derivation from the signal of the speed ($v_Z$) or measurement using an acceleration sensor.

6. The method of claim 1, wherein the actual value of the longitudinal inclination ($\alpha_L$) is determined using an angle measuring sensor or via an elevation profile stored in a GPS unit.

7. The method of claim 1, wherein the actual value of the longitudinal inclination ($\alpha_L$) is determined by comparing an upward-slope-compensated signal of the longitudinal deceleration ($a_L$), as determined by an acceleration sensor, with a non-upward-slope-compensated signal of the longitudinal deceleration ($a_L$), as determined via the mathematical derivation of the speed ($v_Z$).

8. A device for determining braking-related actual values of a train assembly including plurality of carriages, for carrying out deceleration-controlled braking of the train assembly, the device comprising:
a deceleration controller/deceleration force controller that outputs a manipulated variable compensating for the system deviation for an actuator of the brake in accordance with a predefined setpoint value ($a_S$) of a desired braking deceleration, wherein the manipulated variable is determined based on the longitudinal deceleration ($a_L$) and longitudinal inclination ($\alpha_L$); and
a central measured value capture unit positioned only in a frontmost, only a rearmost, or only the front and rearmost train part and having a plurality of sensors configured to capture and/or calculate the braking-related actual values for the entire train assembly,
wherein the deceleration controller/deceleration force controller takes into account length of the train ($L_Z$) as an additional centrally determined actual value such that the manipulated variable for compensating for the system deviation is calculated based on a braking requirement that is different depending on the train length based on a rise profile resulting from the determined longitudinal inclination ($\alpha_L$) in the frontmost train part along the train length ($L_Z$), and
wherein the inclination-based longitudinal deceleration (aL) is determined by the central measured value capture unit separately for each carriage of the train assembly based on a stored train model, a longitudinal inclination, and a measured speed.

9. The device of claim 8, wherein the measured value capture unit determines the train length ($L_Z$) from the train model which is based on the number of carriages of the train assembly which are coupled to one another and their respective length.

10. A non-transitory computer readable medium with program code for carrying out a method for determining braking-related actual values of a train assembly including a plurality of carriages for carrying out deceleration-controlled braking of the train assembly, when the computer program product runs on an electronic device, the method comprising:
capturing and/or calculating braking-related actual values for the entire train assembly by a central measured value capture unit positioned only in a frontmost, only a rearmost, or only the front and rearmost train part and having a plurality of sensors; and
determining a manipulated variable for compensating for system deviation for an actuator of a brake by a deceleration controller/deceleration force controller in accordance with a predefined setpoint value of a desired braking deceleration, wherein the determination is based on longitudinal deceleration ($a_L$) and longitudinal inclination ($\alpha_L$) as actual values,
wherein the manipulated variable is further determined based on a length of the train ($L_Z$) as an additional centrally determined actual value by the deceleration controller/deceleration force controller such that calculation of the manipulated variable for compensating for the system deviation includes a braking requirement that is different depending on the train length based on a rise profile resulting from the determined longitudinal inclination ($\alpha_L$) in the frontmost train part along the train length ($L_Z$), and
wherein the inclination-based longitudinal deceleration (aL) is determined by the central measured value capture unit separately for each carriage of the train assembly based on a stored train model, a longitudinal inclination, and a measured speed.

* * * * *